US006843945B1

(12) United States Patent
Lee et al.

(10) Patent No.: US 6,843,945 B1
(45) Date of Patent: Jan. 18, 2005

(54) IN-MOLD COATING OF POLYMER COMPOSITE PARTS FOR METALLIZATION AND PAINTING

(75) Inventors: Hsai-Yin Lee, Troy, MI (US); Joseph A. Hulway, Romeo, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/755,841

(22) Filed: Jan. 12, 2004

(51) Int. Cl.[7] .......................... B29D 9/00; B05D 3/10; B05D 5/00

(52) U.S. Cl. ......................... 264/49; 427/270; 427/404; 427/407.1; 264/232; 264/344

(58) Field of Search ................................ 427/133, 230, 427/258, 270, 271, 404, 407.1, 412.1, 412.5; 264/41, 45.1, 49, 232, 340, 344

(56) References Cited

U.S. PATENT DOCUMENTS 3,980,613 A * 9/1976 Bachot et al. ............ 264/45.3
4,039,714 A * 8/1977 Roubal et al. ............. 428/336
4,157,424 A * 6/1979 Boutle ........................ 521/61

* cited by examiner

*Primary Examiner*—Bret Chen
*Assistant Examiner*—William Phillip Fletcher, III
(74) *Attorney, Agent, or Firm*—Kathryn A. Marra

(57) ABSTRACT

The surface of a molded fiber reinforced polymer matrix article is prepared for subsequent metallization and painting by coating the molded article, preferably while it is still in its mold, with a layer of calcium carbonate-filled, but fiber-free polymer. The calcium carbonate-filled coating is then etched to dissolve particles of calcium carbonate from the surface layer to form fiber-free micro-pores in the surface layer. This porous provides an improved base for the deposition of a metal layer for receiving adherent paint layers and preventing "out-gassing" of the composite body during baking of the paint layers.

15 Claims, No Drawings

IN-MOLD COATING OF POLYMER COMPOSITE PARTS FOR METALLIZATION AND PAINTING

TECHNICAL FIELD

This invention pertains to painting fiber-reinforced polymer composite parts. More specifically, this invention pertains to the application of calcium carbonate filled, fiber-free coatings on such composite parts to facilitate metallization of the part surfaces for subsequent defect-free painting.

BACKGROUND OF THE INVENTION

Fiber reinforced polymer composite parts are useful in many applications and offer weight savings as parts for automotive vehicles. For example, vehicle body panels have been compression molded of glass fiber reinforced sheet molding compound (SMC). In the case of automotive external body panels they must be painted to have a commercially acceptable glossy appearance free of surface and edge defects.

The term "polymer composite" broadly refers to polymer based compositions that are formulated to contain additives to improve their properties for a specific application. The polymer composites may contain, for example, reinforcing fibers, fillers, pigments and other polymers. In the case of automotive vehicle body panel applications, polymer composites include, for example, compression molded sheet molding compound (SMC) containing unsaturated polyester and polystyrene resins, reinforced reaction injection molded (RRIM) polyurea polymers, or injection molded products containing poly (phenylene oxide) (PPO)/nylon based resins. Such polymer composite parts are lighter than comparably sized steel panels. However, the composites do have to be painted for body panel applications, and it has been difficult to paint the composite body panels without introducing surface defects.

Automotive painting operations are typically carried out on a body-in-white. A body-in-white is the unpainted unitary body structure comprising body panels and structural components. Such a body structure is usually formed mostly of steel panels but now may include some polymer composite panels. The paint shop practice is established for the steel portion of the body which is electrically conductive and receives several coating layers for corrosion resistance, paint adhesion and painted surface finish quality. The composite panels do not respond to the several coating procedures in the same way as the steel panels. For example, automotive painting operations often involve the separate application of a zinc phosphate base layer, an electrocoated liquid prime coat using water or an organic solvent, a liquid or powder primer surfacer layer, a liquid base color coat and a liquid or powder clear top coat. But there is no deposition of either the zinc phosphate coating or the electrocoated prime on the typical composite panel surfaces.

Following each of the prime coat, the primer surfacer and the clear top coat applications there is a baking step at temperatures of 250° F. or higher to cure or dry the new layer and to promote flow of the top coat films to a commercially acceptable finish for a vehicle. Such aggressive heating of the painted composites typically leads to "out-gassing." Out-gassing is the release of entrapped air, solvent, moisture, and uncured chemicals and polymer precursor materials from the somewhat porous composite substrate. Too often the result is an unsightly and unacceptable rough surface. Out-gassing was initially experienced with liquid primer surfacer paints at their 250° F. bake temperature. The occurrence of surface roughness with such paint systems has been reduced in some instances by the use of a special formulated, electrically conductive polymer prime coat as a barrier coat after molding. This polymeric prime coat on the composite surface may reduce out-gassing at that location. But this coating doesn't appear to work for all molded polymer composite and liquid paint combinations, and it completely fails to prevent out-gassing during the flow and curing of powder paints which require even higher bake temperatures (350° F.).

U.S. Patent Application publication 2003/0201186 A1, entitled Metallization of Polymer Composite Parts for Painting and U.S. patent application Ser. No. 10/304,086, filed Nov. 25, 2002, entitled Metallization of Polymer Parts for Painting, both assigned to the assignee of this invention, disclose methods of treating the surfaces of polymer composite articles of manufacture to avoid out-gassing caused defects during post-molding painting operations. Those patent specifications disclose the practice of providing a conductive metal coating on molded polymer composite surfaces to permit, for example, the phosphating and subsequent prime coatings and top coatings of automotive body panels yielding uniform appearing and high quality surface finishes. They are methods that result in the formation of, for example, a zinc or zinc based alloy coating on the composite surface prior to painting. Other metals such as aluminum or iron compositions may be suitable, but zinc is preferred. The zinc coating prepares the surface of the composite part for phosphating or the like, if desired. The zinc layer makes the surface of the composite conductive for electrostatic painting with liquid (solvent or water based) or dry powder paints, and it provides an impermeable layer to prevent out-gassing from the composite into paint layers, especially during paint drying or curing steps. The entire texts of the above identified patent specifications are incorporated herein by reference.

Sometimes it is preferred to etch the surface of a molded composite polymer article to receive and anchor a coating of suitable metal. Acid etching attacks the cross-linked polymer matrix and roughens and oxidizes the surface of the heterogeneous composite composition. Deposited metal can then interlock with the cratered surface. In the case of a fiber reinforced polymer composite article, etching exposes but does not remove the reinforcing fibers (for example, glass or carbon fibers) and the exposed fibers provide an undesirable surface for the deposition of a metal layer. It is an object of the present invention to provide a process for altering the surface of a molded fiber reinforced polymer composite article to better receive and hold an adherent coating of metal preparatory to painting of the article.

SUMMARY OF THE INVENTION

In accordance with a preferred embodiment of the subject invention, the surfaces of a fiber reinforced polymer composite article are coated with a calcium carbonate filled, reinforcing-fiber free, polymer composition which is cured on the surface of the article to be painted. The calcium carbonate filled polymer coating is etched with a suitable acid such as aqueous sulfuric acid and/or chromic acid to roughen the surface and expose calcium carbonate particle sites. Hydrochloric acid is then used to dissolve calcium carbonate filler particles from the filled polymeric layer to provide small holes for anchoring a metal coating to the applied polymer layer. Thus, the acid etching of the calcium carbonate filled layer leaves microscopic anchoring holes but no fibers that might interfere with deposition of the metal are exposed in the surface to be metallized. The thickness of the coating is suitable to prevent exposure of fibers from the underlying fiber-filled polymer composite molding.

Calcium carbonate is the preferred particulate filler for the fiber-free coating because it is inexpensive and calcium carbonate particles are readily dissolved in an acid such as hydrochloric acid once polymer matrix material is removed from the surface. However, any suitable particulate filler material can be used in a fiber-free coating so long as it can be easily removed from the coating to leave a porous surface for subsequent metallization in accordance with this invention.

Most fiber-reinforced polymeric composite articles are molded in compression molds comprising matching mold dies that can be opened and closed. In a preferred embodiment of this invention the calcium carbonate filled polymer layer is applied as an in-mold coating while the composite article is still in its mold and in a suitably cured condition. A mixture of calcium carbonate particles with liquid polymer precursor materials is injected under suitable pressure into the un-opened or partially opened mold and over surfaces of the hardened molded article. The $CaCO_3$ particle filled coating is cured or dried in the mold onto the surface of the molded article. When the mold is opened, the molded fiber-reinforced article with its fiber-free and calcium carbonate-containing coating is removed for etching, metallization and painting.

The subsequent deposition of, for example, an electroless copper or nickel layer is benefited by the fiber-free, etched micro-porous surface on the coated fiber reinforced article. A layer of zinc or other suitable metal is then electrodeposited on the electrically conductive copper or nickel film as described below and in the referenced patent application.

This invention is particularly applicable in the painting of molded fiber-reinforced composite body panels for exterior automotive vehicle surfaces. The fiber-free, in-mold coating on the polymer composite provides an excellent surface, after filler particle removal, for deposition of the zinc layer which serves as a base for painting and as a barrier to potential out-gassing of the polymer composite molding during paint baking or drying. The adherent metal layer provides a particularly good base and out-gassing barrier for powder paint coatings which require relatively high baking temperatures for flow leveling on a painted surface.

Polymer compositions for in-the-mold coating of molded polymer composite articles are known and in commercial use. Examples of suitable in-mold coating compositions, IMC, include single-component, peroxide initiated, polyester compositions and two-component precursor materials for polyurethane resins. Such materials are injected into a partially opened mold containing, for example, a just-molded fiber reinforced SMC panel, or the IMC is injected under higher pressure without opening the mold. The $CaCO_3$ filled IMC is sufficiently fluid so that it flows between the mold surfaces and the adjacent surfaces of the molded fiber-reinforced, polymer composite part. The IMC cures or dries in the mold on the surface of the polymer composite and is often formulated to bond to the surface of the polymer composite article as it cures or dries. The injection is made after the molded SMC part has cured to an extent that the force of the IMC flowing against and over surfaces of the part does not damage it. In the practice of this invention, the IMC comprises a suitable filler such as calcium carbonate, but no fibers. The calcium carbonate content of the IMC is dissolved by etchants such as hydrochloric acid to provide anchoring sites for a deposited metal film. The fiber-free IMC thus provides a generally homogeneous but porous surface for the metal deposition.

Other objects and advantages of the invention will become more apparent from a description of preferred embodiments which follow.

DESCRIPTION OF A PREFERRED EMBODIMENT

This invention is applicable to fiber reinforced polymer materials of the type that are formulated of suitable precursor materials that can be molded under heat and pressure into useful articles of manufacture. The composition of the molded fiber-reinforced article is not critical to the practice of the invention. In the automotive industry, for example, glass fiber reinforced, thermosetting, highly cross-linkable, sheet molding compound (SMC) is compression molded into articles such as body panels. Similar and other thermosetting materials in different formulations are used as Bulk Molding Compounds (BMC), Low Pressure Sheet Molding Compounds (LPMC), Glass Mat Thermoplastics (GMT) and Resin Transfer Molding (RTM) materials. This invention is applicable to fiber reinforced articles of such materials especially when it is desired to provide the articles with an oven baked smooth, glossy painted finish free of blemishes from out-gassing of the polymer material.

In general and for purposes of illustrative example, SMC technology will be described. SMC technology comprises two distinct manufacturing steps: compounding and molding.

In the compounding operation all ingredients except glass reinforcing fibers are mixed together to form a paste that will become the polymer matrix. The proportions and specific composition of the ingredients may vary. An unsaturated polyester resin is combined with styrene as the thermosetting resin precursors. This thermosetting resin mix often includes a low-profile additive such as poly (vinyl acetate) to control the amount of shrinkage of the resin system during polymerization. Magnesium oxide or hydroxide is used as a thickener and zinc stearate is used as an internal mold release. P-benzoquinone is used to prevent measurable levels of un-wanted or untimely copolymerization or cross linking of the paste. A peroxide polymerization initiator such as t-butyl peroxybenzoate is included in the resin mixture paste. Particulate calcium carbonate is typically used as a filler.

The paste is then applied to two carrier films (usually polyethylene) to form a sandwich layer with glass fiber (usually chopped glass fibers about 25 mm long) in the middle. The fibers are then wetted with this paste to form the final sheet molding compound. The compounded sheets are then stored to age in a controlled environment for the paste viscosity to reach a level sufficient for molding. When the compound is ready for molding it is cut into pieces (charge layers) of predetermined dimensions. The pieces are then stacked in a specific arrangement (charge pattern) in the mold so that the flow of the material is optimal. The flow is achieved by the compression action of the mold, which is normally a matched set of steel dies heated to about 150° C. The heat from the mold activates the polymerization of the thermosetting resin, resulting in the solidification of the material. Molding of SMC materials at 150° C. is usually completed in about 30 to 150 seconds.

The fiber content of the molded article typically extends throughout the body of the article and underlies or even penetrates the surface of the article. In accordance with this invention the surfaces of the article, at least those surfaces which are to be metallized and painted, are coated with a polymer composition containing calcium carbonate but no fibers. The $CaCO_3$ filled polymer composition may be any polymer precursor composition that is compatible with and adheres to the molded article and that, after curing or drying, can be etched to remove filler material from its surface to provide small pores for receiving and binding a deposit of metal.

In-mold coatings for molded SMC material have been commercially available for many years. A two-component version containing unsaturated polyester and isocyanate was introduced in 1970. Since then, one component systems based on free radically cured, unsaturated oligomers and monomers have been developed that give excellent adhesion to SMC. These products now dominate the market because of their freedom from metering and mixing difficulties of two component systems and the moisture sensitivity of the polyurethane based IMC. A typical IMC contains unsaturated oligomers such as polyester and monomers such as styrene selected to give adequate hot hardness and adhesion to SMC, peroxide to give desired cure rates, benzoquinone to provide shelf life and increased flow time, high-structure carbon black for conductivity for subsequent electrostatic painting, poly (vinyl acetate) for paint adhesion, fillers such as talc to give hardness and less shrinkage and zinc stearate as an internal mold release agent. They are formulated with sufficiently low viscosity to flow over the surface of the molded SMC part. In accordance with this invention fillers such as talc and carbon black are not required. Rather, the in-mold coating is filled with a suitable quantity of calcium carbonate powder (or equivalent aqueous acid soluble material) for effective etching of the coated surface. Calcium carbonate contents of 20 to 60 percent by weight of the in-mold coating have been used. $CaCO_3$ filler content of about 50% has been preferred.

The $CaCO_3$ filled polymer coating may be applied to the fiber-reinforced article in any desired manner. For example, it can be sprayed or brushed on the surface of a de-molded article. However, it is preferred that the coating is applied to the fiber reinforced article while the molded body is still in the mold. Such in-mold practices are well known and widely practiced. But in this process the in-mold coating contains finely divided particulate filler, such as calcium carbonate, that can be etched from the coating with aqueous acid. The in-mold coated, fiber reinforced article is removed from the mold after both the article and coating have been suitably cured. Curing of SMC in-mold coating materials typically requires about 5 to 25 seconds. The thickness of the applied calcium carbonate filled coating is suitably of the order of about 60 to 120 micrometers.

The practice of the invention will be further illustrated in an embodiment in which an electroless copper layer is first applied to the etched in-mold coated surface as a base layer for an electrodeposited zinc coating.

The coated and molded composite part is dipped in an etching solution (e.g. a mixture of sulfuric and chromic acids in water) to roughen the surface by attacking the cross-linked resin matrix and expose the calcium carbonate sites. After such etching the surface is treated with a base to neutralize the acids and rinsed to remove the chromium.

An acid such as concentrated hydrochloric acid in water is then used to dissolve calcium carbonate particles from the in-mold coating. The dissolution of the filler particles leaves micron-sized pores in the surface. The acid etchant also oxidizes the surface. Thus, etching provides a roughened surface for mechanical interlocking with the copper layer to be deposited. But the porous surface is free of projecting fibers which interrupt and interfere with the continuity of a deposited metal film layer into the pores and over the rest of the surface. The etching also makes the composite surface more hydrophilic for the following process steps. Following a suitable etching period, the part is removed from the etching solution and dipped in a neutralizing rinse to remove residual acids.

The following Table 1 summarizes conditions for etching the coating surface and dissolving calcium carbonate particles. References to commercial products in this and following Tables 2 and 3 are trademarked products of Arotech USA, Inc.

TABLE 1

| Steps | Preferred Conditions | Condition ranges | Preferred solution make-ups | Solution make-up ranges |
|---|---|---|---|---|
| Etching | 70° C., 2 min | 50–90° C., 1–5 min | Chromic acid (490 g/L) Sulfuric acid 16% (vol.) in water | Chromic acid (300–500 g/L) Sulfuric acid 10–20% (vol.) in water. |
| Rinse | Room Temp. 30 sec | | Deionized water | |
| Rinse | Room Temp. 2 min | | Deionized water | |
| Neutralization | 80 ° C., 10 min | Room Temperature-90° C., 5–30 min | Ethylene-diamine 20% (vol.) in water | Ethylene-diamine 5–25% (vol.) in water |
| Rinse | Room Temp. 2 min | | Deionized water | |
| Calcium Carbonate Removal | Room Temp. 30 min | Room Temp. 5–60 min | Conc. hydrochloric acid 25% (vol.) Acid cleaner AFR-3 5% (vol.) in water | Conc. hydrochloric acid 5–35% (vol.) Acid cleaner AFR-3 0–10% (vol.) in water |

The etched in-mold coated surface is then treated (activated) with an aqueous colloidal suspension of a suitable mixture of tin and palladium chlorides to deposit catalytic nuclei particles of palladium at sites on the microporous surface. The excess tin is then removed from the palladium-activated surface.

The activated in-mold coated surface is then contacted with a bath of suitable electroless copper plating composition. The catalyzed composite surface promotes the reduction of the copper compound(s) in the bath to deposit a copper coating film on the surface of the molded composite article. The thickness of the copper film is, for example, about one-half to one micrometer. As illustrated in the following table of processing conditions and compositions the activation and electroless deposition steps may be repeated as necessary to obtain a suitable level of conductivity for the zinc deposition. An electroless nickel deposit may be made instead of the copper layer. But the object of this metal deposition step is to make the composite surface uniformly conductive and receptive to the electroplating of a suitable zinc or zinc alloy coating.

TABLE 2

| Steps | Preferred Conditions | Condition ranges | Preferred solution make-ups | Solution make-up ranges |
|---|---|---|---|---|
| Rinse | Room Temp. 2 min | | Deionized water | |
| Pre-dip | Room Temp. 1 min | | Sodium hydroxide (220 g/L) conc. hydrochloric acid (10 ml/L) in water | Sodium hydroxide (100–250 g/L) conc. hydrochloric acid (3–20 ml/L) in water |
| Activation (I) | 43° C., 3 min | 30–60° C., 2–6 min | Pre-dip solution 96% (vol.) Futuron activator concentrate 4% (vol.) | Pre-dip solution 80–98% (vol.) Futuron activator concentrate 2–20% (vol.) |
| Rinse | Room Temp. 2 min | | Deionized water | |
| Electroless Cu deposit (I) | 60° C., 3 min | 30–80° C., 2–6 min | Futuron Cu-link part-A 9% (vol.) Futuron Cu-link part-B 40% (vol.) in water | Futuron Cu-link part-A 5–15% (vol.) Futuron Cu-link part-B 20–60% (vol.) in water |
| Rinse | Room Temp. 2 min | | Deionized water | |
| Activation (II) | 60° C., 3 min | 30–60° C., 2–6 min | Pre-dip solution 96% (vol.) Futuron activator concentrate 4% (vol.) | Pre-dip solution 80–98% (vol.) Futuron activator concentrate 2–20% (vol.) |
| Rinse | Room Temp. 2 min | | Deionized water | |
| Electroless Cu deposit (II) | 60° C., 3 min | 30–80° C., 2–6 min | Futuron Cu-link part-A 9% (vol.) Futuron Cu-link part-B 40% (vol.) in water | Futuron Cu-link part-A 5–15% (vol.) Futuron Cu-link part-B 20–60% (vol.) in water |
| Rinse | Room Temp. 2 min | | Deionized water | |
| Activation (III)* | 60° C., 3 min | 30–60° C., 2–6 min | Pre-dip solution 96% (vol.) Futuron activator concentrate 4% (vol.) | Pre-dip solution 80–98% (vol.) Futuron activator concentrate 2–20% (vol.) |
| Electroless Cu deposit (III)* | 60° C., 3 min | 30–80° C., 2–6 min | Futuron Cu-link part-A 9% (vol.) Futuron Cu-link part-B 40% (vol.) in water | Futuron Cu-link part-A 5–15% (vol.) Futuron Cu-link part-B 20–60% (vol.) in water |
| Rinse | Room Temp. 2 min | | Deionized water | |
| Air drying | 70° C., 20 min | Room Temperature-120° C., 5–40 min | | |

*Activation (III) and Electroless Cu deposit (III) may not be necessary.

Zinc electroplating of the conductive in-mold coated surface can now be accomplished. Zinc or a zinc alloy can be electroplated by any suitable commercial acid or alkaline zinc plating process. An example of a zinc alloy is one containing, for example, six to twelve or thirteen percent by weight nickel. A zinc coating thickness of about fifteen to twenty-five micrometers is preferred. The surface of the molded article is then ready for phosphating and/or painting in accordance with the requirements of the final polymer composite product. The zinc coating makes the composite article particularly ready for painting and paint baking operations of the type carried out in an automotive paint shop.

TABLE 3

| Steps | Preferred Conditions | Condition ranges | Preferred solution make-ups | Solution make-up ranges |
|---|---|---|---|---|
| Zinc plating | Room Temperature 20 ampere/ft$^2$ Air agitation Zinc thickness 20 micron | Room Temperature-50° C. 10–70 ampere/ft$^2$ air agitation or mechanical Agitation Zinc thickness 10–40 micron | Zinc chloride 56 g/L Potassium chloride 176 g/L Boric acid 30 g/L Zylite HT additive solution 3% (vol.) Zylite HTMB brightener 0.2% (vol.) Ph 5.0–5.3 | Zinc chloride 45–90 g/L Potassium chloride 150–270 g/L Boric acid 15–50 g/L Zylite HT additive solution 0–6% (vol.) Zylite HTMB brightener 0–1% (vol.) Ph 4.8–5.9 |
| Rinse | Room Temp. | | Deionized water | |

TABLE 3-continued

| Steps | Preferred Conditions | Condition ranges | Preferred solution make-ups | Solution make-up ranges |
|---|---|---|---|---|
| | 2 min | | | |
| Drying | 70° C., 60 min | Room Temperature-120° C., 5–120 min | | |

Following is an outline of a typical automotive painting process for a composite exterior body panel such as a door, fender, rocker panel or the like.

When the zinc coated composite panel reaches the paint shop as part of an automotive body-in-white (i.e., unpainted body), the vehicle body is cleaned and degreased to remove surface contaminants. The whole body, with its steel panels and composite panels, is immersed in a suitable phosphating bath to form an adherent integral layer of phosphate. As is well known in automotive technology, the phosphate layer provides paint adhesion to the body panels and limits corrosion of the panels due to stone chipping or other damage to the vehicle in use. The zinc layer on the composite panel functions like a "galvanized" zinc layer on a steel panel. And the zinc layer on the composite facilitates the formation of the phosphate layer on the composite panel.

After rinsing and drying, the phosphated vehicle body is immersed in an electrolytic bath of prime coat paint composition. This electrocoat primer is electrolytically dispersed over the entire immersed body. Again, the zinc layer on the composite panel portions of the body promotes the deposition of the corrosion resistant primer coating. The vehicle body is removed from the bath, drained, rinsed and than baked at 350° F. or so to cure the prime coat layer and produce a coherent film over the entire body. The zinc layer resists popping of the composite surface during this high temperature exposure of the composite panel.

A liquid or powder primer surfacer coating is then applied to the prime coated body. The liquid or powder primer surfacer paint is usually charged and the body electrically grounded for this purpose to better attract the sprayed coating. The conductive zinc coating on the composite panels assists in this coating operation. This primer surfacer coating is also baked on the vehicle body at a temperature of 250° F. or 350° F., depending on whether the primer surfacer is a liquid or powder based formulation. The zinc coating on the composite layer stops out-gassing at the painted surface.

Similarly a pigmented paint layer is usually also electrostatically applied to the vehicle body followed by a clear topcoat. These layers are also baked for film flow and curing. Still, the zinc coating on the composite panels prevents the formation of surface defects.

Accordingly, this invention provides a way of preparing fiber reinforced polymer matrix composite articles for high temperature paint baking operations while avoiding the formation of unsightly defects in the surface of the painted composite body. The fibers contribute significantly to the strength and impact resistance of the molded composite articles. However, the application of a fiber-free, calcium carbonate filled, polymer coating on the surface of the molded, fiber reinforced body enhances the forming a strongly adherent zinc based coating (or other metal coating) on the body. This process improves and enables the wide spread use of composite panels in automotive applications where protective and decorative phosphate and/or paint layers are to be applied.

The invention has been described in terms of an illustrative example. Obviously other practices may be adapted to form useful zinc coatings on composite surfaces and thereby realize the benefits of this invention. Accordingly, the scope of the invention is to be considered limited only by the following claims.

What is claimed is:

1. A method of preparing a surface of a molded, fiber reinforced polymer composite article for application of one or more paint layers to said surface when such article is to be subjected to a paint baking operation for at least one of said applied paint layers, said method comprising:

coating said surface of said fiber reinforced article with an overlying co-extensive layer of fiber-free, polymer resin filled with acid soluble filler particles;

dissolving acid soluble filler particles from the surface of said overlying layer to form micro-pores in said layer, said micro-pores being free of fibers of said fiber reinforced polymer composite article; and forming at least one layer of a metal coating on said micro-pore containing, overlying layer as a barrier coating to out-gassing from said polymer composite article during said paint baking operation.

2. The process as recited in claim 1 in which said acid soluble filler particles are calcium carbonate particles.

3. The method as recited in claim 1 in which said fiber reinforced polymer composite article comprises a molding compound containing unsaturated polyester and polystyrene resins.

4. The method as recited in claim 1 in which said overlying layer comprises a molding compound containing unsaturated polyester and polystyrene resins.

5. The method as recited in claim 1 in which said polymer composite article is formed in a mold defining said surface and said overlying co-extensive layer of fiber-free, polymer resin filled with said filler particles is applied to said surface while said article is in said mold.

6. The method as recited in claim 1 in which said metal barrier coating comprises a metal selected from the group consisting of aluminum, iron and zinc.

7. The method as recited in claim 1 in which said metal barrier coating is zinc or a zinc based alloy.

8. A method of preparing a surface of a fiber reinforced polymer composite article for application of one or more paint layers to said surface when such article is to be subjected to a paint baking operation for at least one of said applied paint layers, said method comprising:

forming fiber containing polymeric precursor materials in a mold to obtain said article, said mold comprising mold elements movable between open and closed positions;

coating said surface with an overlying co-extensive layer of fiber-free, polymer resin filled with calcium carbonate particles, said coating being performed while said article is in said mold;

dissolving calcium carbonate particles from the surface of said overlying layer to form micro-pores in said layer, said micro-pores being free of fibers of said fiber reinforced polymer composite; and forming at least one layer of a metal coating on said micro-pore containing, overlying layer as a barrier coating to out-gassing from said polymer composite article during said paint baking operation.

9. The method as recited in claim 8 in which said coating is performed while said mold elements are in their closed position.

10. The method as recited in claim 8 in which said coating is performed while said mold elements are in a position between their open and closed positions.

11. The method as recited in claim 8 in which said fiber reinforced polymer composite article comprises a molding compound containing unsaturated polyester and polystyrene resins.

12. The method as recited in claim 8 in which said overlying layer comprises a molding compound containing unsaturated polyester and polystyrene resins.

13. The method as recited in claim 8 in which said metal barrier coating comprises a metal selected from the group consisting of aluminum, iron and zinc.

14. The method as recited in claim 8 in which said metal barrier coating is zinc or a zinc based alloy.

15. The method as recited in claim 11 in which said overlying layer comprises a molding compound containing unsaturated polyester and polystyrene resins.

* * * * *